Figure 1:
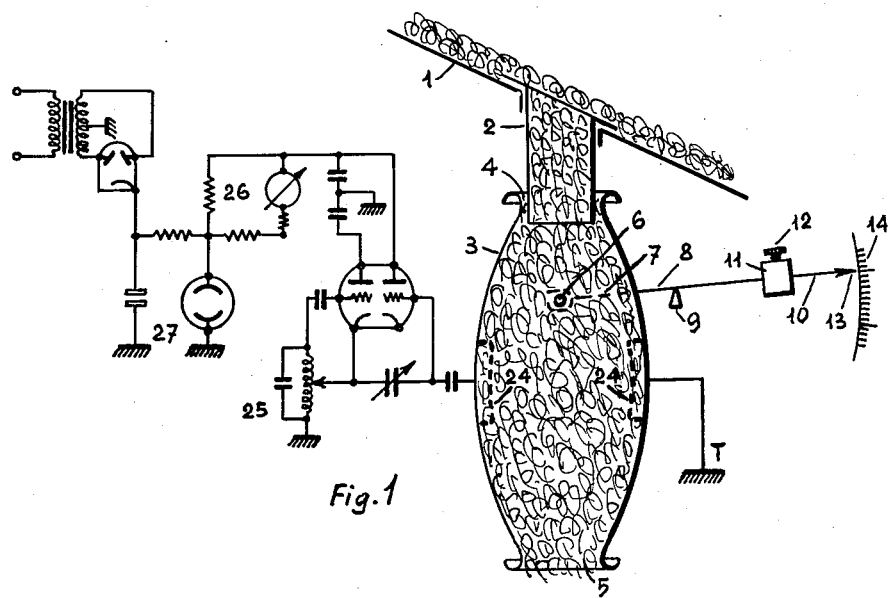

Dec. 11, 1962     M. BALLESTRA     3,067,622
DEVICE FOR THE MEASUREMENT OF THE DENSITY OF
PULVERULENT OR LIQUID MATERIALS
Filed Oct. 6, 1959

_United States Patent Office_ 3,067,622
Patented Dec. 11, 1962

3,067,622
DEVICE FOR THE MEASUREMENT OF THE DENSITY OF PULVERULENT OR LIQUID MATERIALS
Mario Ballestra, Via XX Settembre 40/8, Genoa, Italy
Filed Oct. 6, 1959, Ser. No. 844,730
Claims priority, application Italy Oct. 11, 1958
5 Claims. (Cl. 73—434)

In many industrial plants in which materials in the pulverulent state or in the form of a mixture or in a liquid solution are worked, it is often useful to know the density of the materials being fed to the plants, and particularly the possible variations in their density.

The device according to the present invention works out the problem of measuring in a continuous way the density of the dust or liquid passing through the device, so as to indicate the possible density variations.

The device for the measurement of pulverulent or liquid materials according to the present invention, is characterized by comprising a vessel through which flows the material whose density is to be determined, said vessel being connected to one arm of a lever with an inside articulation, to the other arm of which is applied a reaction force and an indicator moving on a graduated table.

The above device is also characterized by comprising: a double frusto-conical vessel with its bigger bases connected to each other, or the like, placed with its vertical axis, provided with two openings in correspondence with the two smaller bases, through which vessel the pulverulent material flows; said vessel is also provided at the outside with two pivots, symmetrically situated on a transversal axis which passes through the vessel above its center of gravity; to said pivots is connected one of the ends of the fork shaped lever; a vessel open at the top with variable shape and capacity provided with an overflow discharge device, through which the liquid material flows, said vessel too is provided at the outside with two pivots, symmetrically placed on a transversal axis passing above its center of gravity, one of the ends of the fork shaped lever being connected to said pivots; the reaction force applied to the other arm of the lever, whose end is provided with an indicator, being caused by means of a slider counterweight, provided with a fastening screw to make the device and its indicator assume the desired density position; the reaction force applied to the other arm of the lever, whose end is provided with an indicator, caused by means of a spring, with controllable deformation, to make the device and its indicator the desired density position; in the case when the vessel is passed through by a pulverulent material which may have a variable degree of humidity capable of influencing the measurement made through the lever arm or the spring or any other means, the vessel is preferably provided with a device of any known type suitable to measure in a continuous way the degree of humidity of the mixture during its passage through the vessel.

Figure 2:
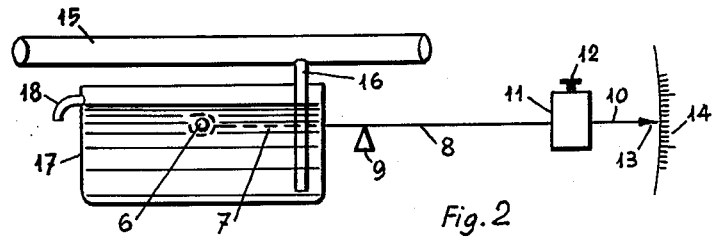
Figure 3:
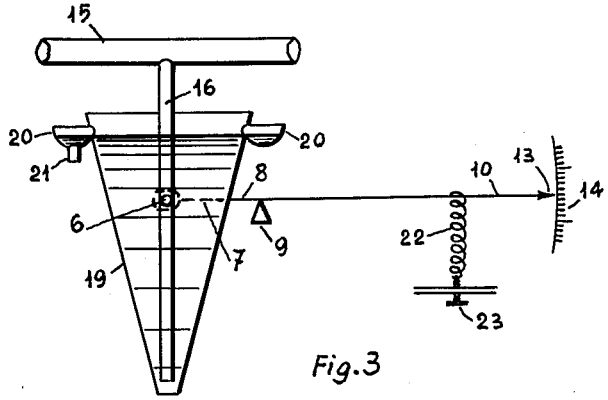

In the accompanying drawing some embodiments of the present invention are shown in a diagrammatic way and only by way of example: FIG. 1 shows an intermediate vertical section of a device for the control of the density of pulverulent materials; FIGS. 2 and 3 show intermediate vertical sections of two different embodiments of a device for the control of the density of liquid materials.

With reference to FIG. 1: 1 denotes a slide element for feeding pulverulent materials; 2 denotes a portion of a pipe which leaves the slide element 1 to carry a part of the material to the measuring device; 3 denotes the device vessel shaped like a double frusto-cone with its bigger bases connected to each other; 4 and 5 denote the two openings, the upper and the lower ones, of said vessel, said openings being provided in correspondence to the smaller bases of the two frusto-cones; 6 denotes one of the two pivots symmetrically placed above the vessel center of gravity; 7 denotes one arm of the fork supporting said vessel 3 said arm being connected to pivot 6; 8 denotes the lever arm carrying the vessel 3; 9 denotes the fulcrum on which oscillates the lever balanced by the vessel 3 full of pulverulent material, and by the slider counterweight 11 movable on arm 10; 12 denotes a pressure screw suitable to fasten the counter-weight 11; 13 denotes an indicator fastened on the end of arm 10, and 14 denotes a stationary graduated scale.

The working of the device for the continuous measurement of the density of pulverulent materials is the following: the pulverulent material enters the vessel 3 through the opening 4, passes through it and goes out through the opening 5 in a continuous way. When the vessel is filled with pulverulent material with the desired density, the weight 11 is moved until it balances the weight of the vessel and of the pulverulent material contained in it, and it is regulated in such a way that the position of the indicator 13 may correspond to a well defined position of the stationary graduated scale 14. When the pulverulent material passing through the vessel increases in density it will accordingly increase the weight applied to the lever arm 8 and the indicator 13 will rise; on the contrary, when the density of the pulverulent material decreases, it will accordingly decrease the weight applied to the arm 8 and the indicator will fall. When it is desired to have a record of the variation in density of the material during a period of time, it is sufficient to replace the indicator 13 with a writing indicator, and the graduated table 14 with a moving paper cylinder.

With reference to FIGS. 2 and 3 keeping as far as possible the previous numerals: 15 denotes the feeding piping of the liquid material; 16 is a portion of a pipe leaving piping 15 to carry a part of the liquid material into the vessel of the control device, extending to the bottom of said vessel; 17 denotes the device vessel with a parallelepiped shape and open at the top; 18 denotes an overflow pipe to keep in the vessel 17 a constant level; 19 is another type of vessel shaped like a cone or a pyramid with its vertex downwardly directed and open at the upper end; 20 denotes an open channel extending around the base of the cone or pyramid; 21 denotes an overflow pipe to keep in the vessel a constant level; 22 denotes a spring passing through the reaction of which the weight of the vessel 19 full of liquid is balanced, and replaces the slider counterweight 11 described in the previous devices; 23 denotes a screw for regulating the pressure of the spring and allowing the regulation of the device.

The working of the device for the measurement of the density of liquid materials is the same as above described for the device for pulverulent materials. The liquid enters the vessels 17 and 19 through the pipes 16 which extend to the bottom of the vessels, and goes out through the discharge pipes 18 and 21. Both the weight 11 and the spring 22 serve to regulate, by means of the screws 12 and 23, the device in the desired position.

In FIG. 1 it is shown that the vessel 3 is provided with a device of any known type to measure continuously the degree of humidity of the pulverulent mixture passing from the top to the bottom of the vessel 3. For this purpose the inside surface of the vessel 3 is provided with two conducting plates 24 one of which is grounded at T, while the other is connected to a device of known type suitable to measure continuously and exactly the resistance met by the current in passing from one plate 24 to the other plate 24. In the given example, the device comprises a high frequency oscillator 25, a valve-voltmeter 26, and a stabilization feeder 27. The working of this device, of known type, for the continuous and exact measurement of the degree of humidity of the pulverulent material passing through the vessel 3, is the following: the high frequency oscillator 25 feeds through a capacitor the vessel 3; the valve-voltmeter 26 registers continuously the voltage variations taking place during the variations in the vessel 3; the anodic feeding is kept steady in order to prevent variations in the voltage from adversely affecting the exactness of the reading and the measures relating to the degree of humidity of the mixture.

It is then understandable that it is possible; by knowing the degree of humidity of the mixture or pulverulent material, to determine the actual and exact density of the mixture or pulverulent material in a dry state or with a degree of humidity different from that which the mixture or pulverulent material has when passing through the vessel 3.

Although the present invention has been described on the basis of what is above stated, many modifications and variations may be made in embodying the invention, as improving the conformation and working of the device for the control of the density, putting into effect the arrangements taught by practice and the use to make easier and more practical its working; all these modifications and variations being however based on the main ideas of the invention, as defined in the following claims.

What I claim is:

1. A measuring apparatus for continuously and simultaneously determining the density and the humidity of a pulverulent material passing therethrough which comprises, in combination, a main vessel having upper and lower end portions and a central portion of greater diameter than said end portions, an inlet opening in the upper end portion of the vessel, an inlet conduit extending coaxially and telescopically into said inlet opening for feeding the material to be measured to said vessel, an outlet opening in the lower end portion of said vessel, said outlet opening being of substantially the same diameter as said inlet opening, and the walls of said vessel gradually increasing from said inlet opening to said central portion and gradually decreasing from said central portion to said outlet opening, said vessel having pivot means disposed on a transverse axis passing above the center of gravity of said vessel, lever means engaged with said pivot means to support said vessel, adjustable weight means on said lever means for counterbalancing the weight of said vessel, a scale, pointer means connected to said lever means for movement with respect to said scale to indicate variations in the weight of the material contained in said vessel at any moment, and means connected with said vessel for simultaneously measuring the humidity of said material at said moment.

2. A measuring apparatus for continuously and simultaneously determining the density and the humidity of a pulverulent material passing therethrough which comprises, in combination, a main vessel having upper and lower end portions and a central portion of greater diameter than said end portions, an inlet opening in the upper end portion of the vessel, an inlet conduit extending coaxially and telescopically into said inlet opening for feeding the material to be measured to said vessel, an outlet opening in the lower end portion of said vessel, said outlet opening being of substantially the same diameter as said inlet opening, and the walls of said vessel gradually increasing from said inlet opening to said central portion and gradually decreasing from said central portion to said outlet opening, said vessel having pivot means disposed on a transverse axis passing above the center of gravity of said vessel, lever means engaged with said pivot means to support said vessel, adjustable weight means on said lever means for counterbalancing the weight of said vessel, a scale, pointer means connected to said lever means for movement with respect to said scale to indicate variations in the weight of the material contained in said vessel at any moment, and means connected with said vessel for simultaneously measuring the humidity of said material at said moment, said last-named means including conducting plates in the wall of the central portion of said vessel.

3. A measuring apparatus for continuously and simultaneously determining the density and the humidity of a pulverulent material passing therethrough which comprises, in combination, a main vessel having upper and lower end portions and a central portion of greater diameter than said end portions, an inlet opening in the upper end portion of the vessel, an inlet conduit extending coaxially and telescopically into said inlet opening for feeding the material to be measured to said vessel, an outlet opening in the lower end portion of said vessel, said outlet opening being of substantially the same diameter as said inlet opening, and the walls of said vessel gradually increasing from said inlet opening to said central portion and gradually decreasing from said central portion to said outlet opening, said vessel having pivot means disposed on a transverse axis passing above the center of gravity of said vessel, lever means engaged with said pivot means to support said vessel, adjustable weight means on said lever means for counterbalancing the weight of said vessel, a scale, pointer means connected to said lever means for movement with respect to said scale to indicate variations in the weight of the material contained in said vessel at any moment, and means connected with said vessel for simultaneously measuring the humidity of said material at said moment, said last-named means including conducting plates in the wall of the central portion of said vessel, one of said plates being grounded and the other plate being connected to a resistance measuring means.

4. A measuring apparatus for continuously and simultaneously determining the density and the humidity of a pulverulent material passing therethrough which comprises, in combination, a main vessel having upper and lower end portions and a central portion of greater diameter than said end portions, an inlet opening in the upper end portion of the vessel, an inlet conduit extending coaxially and telescopically into said inlet opening for feeding the material to be measured to said vessel, an outlet opening in the lower end portion of said vessel, said outlet opening being of substantially the same diameter as said inlet opening, and the walls of said vessel gradually increasing from said inlet opening to said central portion and gradually decreasing from said central portion to said outlet opening, a pair of pivot means disposed on opposite sides of said vessel on a transverse axis passing above the center of gravity of said vessel, lever means having a forked end engaged with said pivot means to support said vessel, slidable weight means on said lever means on the side of the lever fulcrum opposite said forked end for counterbalancing the weight of said vessel, a scale, pointer means connected to the portion of said lever means carrying said weight means for movement with respect to said scale to indicate variations in the weight of the material contained in said vessel at any moment, and means connected with said vessel for simultaneously measuring the humidity of said material at said moment, said last-named means including conducting plates in the wall of the central portion of said vessel.

5. A measuring apparatus for continuously and simultaneously determining the density and the humidity of a pulverulent material passing therethrough which comprises, in combination, a main vessel having upper and lower end portions and a central portion of greater diameter than said end portions, an inlet opening in the upper end portion of the vessel, an inlet conduit extending coaxially and telescopically into said inlet opening for feeding the material to be measured to said vessel, an outlet opening in the lower end portion of said vessel, said outlet opening being of substantially the same diameter as said inlet opening, and the walls of said vessel gradually increasing from said inlet opening to said central portion and gradually decreasing from said central portion to said outlet opening, a pair of pivot means disposed on opposite sides of said vessel on a transverse axis passing above the center of gravity of said vessel, lever means having a forked end engaged with said pivot means to support said vessel, slidable weight means on said lever means on the side of the lever fulcrum opposite said forked end for counterbalancing the weight of said vessel, a scale, pointer means connected to the portion of said lever means carrying said weight means for movement with respect to said scale to indicate variations in the weight of the material contained in said vessel at any moment, and means connected with said vessel for simultaneously measuring the humidity of said material at said moment, one of said plates being grounded and the other plate being connected to a resistance measuring means.

References Cited in the file of this patent

UNITED STATES PATENTS

| | | |
|---|---|---|
| 1,271,660 | Brunner | July 9, 1918 |
| 1,708,073 | Allen | Apr. 9, 1929 |
| 2,578,118 | Wood | Dec. 11, 1951 |

FOREIGN PATENTS

| | | |
|---|---|---|
| 456 | Great Britain | Mar. 27, 1897 |
| 22,194 | Great Britain | Oct. 15, 1904 |
| 12,197 | Great Britain | Oct. 23, 1913 |
| 645,431 | Germany | May 27, 1937 |
| 1,006,622 | Germany | Apr. 18, 1957 |